(12) United States Patent
Donzier et al.

(10) Patent No.: US 6,615,664 B1
(45) Date of Patent: Sep. 9, 2003

(54) METHOD OF MEASURING PRESSURE BY MEANS OF A PRESSURE GAUGE HAVING A RESONANT ELEMENT

(75) Inventors: Eric Donzier, Girton-Cambridge (GB); Fadhel Rezgui, Sceaux (FR); Alfred Permuy, Rueil-Malmaison (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/958,419

(22) PCT Filed: Apr. 6, 2000

(86) PCT No.: PCT/EP00/03095

§ 371 (c)(1), (2), (4) Date: Jan. 22, 2002

(87) PCT Pub. No.: WO00/63664

PCT Pub. Date: Oct. 26, 2000

(30) Foreign Application Priority Data

Apr. 14, 1999 (FR) .............................................. 99 04634

(51) Int. Cl.[7] ................................................. G01L 9/00
(52) U.S. Cl. ............................ 73/702; 73/718; 73/724; 73/717; 310/361
(58) Field of Search .......................... 73/702, 724, 718, 73/717, 723; 310/361, 338, 346, 369; 367/15

(56) References Cited

U.S. PATENT DOCUMENTS 3,561,832 A * 2/1971 Karrer et al. ................ 310/338
3,675,193 A * 7/1972 Davis .......................... 367/15

* cited by examiner

Primary Examiner—Andrew H. Hirshfeld
Assistant Examiner—Marissa Ferguson
(74) Attorney, Agent, or Firm—Brigitto L. Jeffery; John J. Ryberg

(57) ABSTRACT

The invention relates to a method of measuring pressure in which an evacuated capsule (1) containing a resonant element (5) is placed in the fluid whose pressure is to be measured, a vibration characteristic of the element is measured, and the pressure is deduced from said characteristic. A resonant element is used which, during measurement, is to be found in a stress state that is close to buckling. For this purpose, it is possible to use heater means for heating the element and servo-controlled so as to keep the frequency of vibration thereof constant. The resonant element can be made of silicon. The invention is particularly applicable to oil wells.

15 Claims, 1 Drawing Sheet

Figure 1:
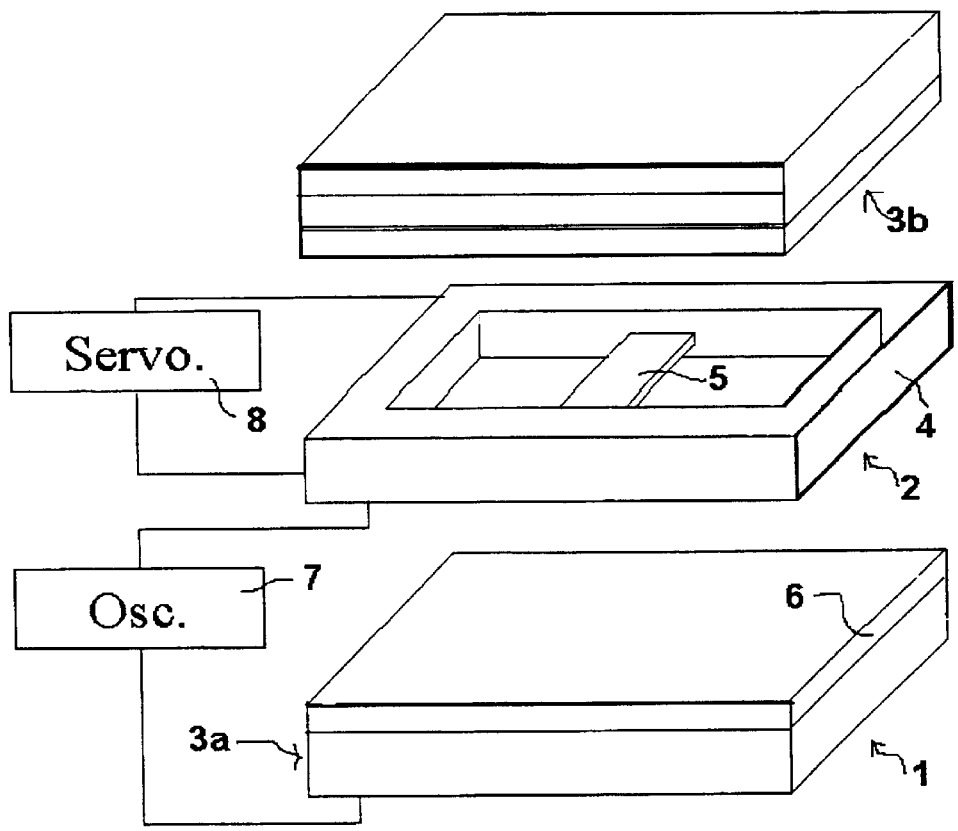

METHOD OF MEASURING PRESSURE BY MEANS OF A PRESSURE GAUGE HAVING A RESONANT ELEMENT

The present invention relates to a method of measuring pressure by means of a pressure gauge having a resonant element, in particular for use in oil wells, and more particularly the invention relates to such a method in which an evacuated capsule containing a resonant element is placed in the fluid whose pressure is to be measured, a resonance characteristic of the element is measured, and the pressure is deduced from said characteristic.

Document U.S. Pat. No. 4,547,691 discloses sensors of this type, known as crystal quartz gauges (CQGs) in which the evacuated capsule and the vibrating beam it contains are both made of quartz. Such sensors have the advantages of being capable of operating in a hostile environment, at very high pressure (up to 1500 kg/cm$^2$), and at high temperatures (up to 200° C.), thereby making them particularly suitable for use in the field of oil exploration, particularly for continuous monitoring of deposits. Finally, they present very good accuracy, of the order of 0.01% of full scale.

The quartz beam is set into resonance by the piezoelectric effect and the frequency of its vibration is measured accurately. The pressure to which the cell is subjected is deduced therefrom. Since the frequency of vibration is relatively insensitive to the effects of aging, of drift, of fatigue due to stress relaxation, of thermoelectric effects, or of instability of the electronics, such quartz sensors are therefore also very stable and of good resolution, unlike membrane or strain-gauge pressure sensors.

Nevertheless, they have the drawback of being high in cost and of possessing dimensions that are relatively large.

The present invention seeks to mitigate those drawbacks.

More particularly, the invention seeks to provide a pressure gauge that is capable of operating under the same conditions as a quartz pressure gauge and of providing a measurement of the same accuracy, but which is much easier to industrialize and which is of much lower cost.

Still more particularly, the invention seeks to provide both a method of measuring pressure and a pressure gauge which can be used on a large scale in the oil industry, particularly for continuous monitoring of deposits, but which could also be used while drilling.

To this end, the invention firstly provides a method of measuring pressure by as pressure gauge having a resonant element, in particular for use in oil wells, in which an evacuated capsule containing a resonant element is placed in the fluid whose pressure is to be measured, a resonance characteristic of the element is measured, and the pressure is deduced from said characteristic, the method being characterized by the fact that a resonant element is used which is to be found, during measurement, in a stress state that is close to buckling.

It will be observed that the invention relates to sensors having a resonant element, i.e. sensors of the same type as the above-mentioned quartz sensors, and not membrane or strain-gauge sensors. Advantage is thus taken of the fact that the magnitude being measured is associated with a frequency of vibration and not with a deformation.

In addition, the sensitivity of the method of the invention is increased by the fact that the resonant element is in a stress state that is close to buckling. Under such circumstances, the stiffness of the beam tends towards zero. A very small variation in the compression exerted thereon therefore gives rise to a considerable variation in its frequency of vibration. This provides mechanical amplification of the sensitivity of the sensor.

Advantageously, the resonant element is made of silicon.

This makes it possible to benefit from the excellent mechanical properties of silicon, particularly when it is monocrystalline. In addition, technology associated with using monocrystalline silicon is thoroughly mastered and well adapted to mass production.

It will be observed that, other things being equal, the sensitivity of a resonant element sensor made of silicon would normally be much less than that of an equivalent quartz sensor. The method of the invention makes it possible to remedy that drawback because measurement is performed while the resonant element is in a stress state that is close to buckling.

Two implementations of the method can be envisaged.

Firstly, it is possible merely to excite the element to resonance and measure its frequency of vibration.

The sensor is then operating in an open loop mode. The stress state of the resonant element, and thus its frequency of vibration, depend on the pressure to be measured.

In the other implementation, the stress state of the resonant element is adjusted to the limiting condition for buckling within the range of pressures to be measured.

Its frequency thus remains constant, and pressure is measured by measuring the stress applied to the resonant element. The sensor is then operating in a servo-controlled mode.

In a particular implementation, it is the temperature of the resonant element that is adjusted, e.g. using the Joule effect, so as to keep it in a stress state close to buckling.

Under such circumstances, a thermal expansion stress is thus added to the mechanical stress exerted on the element by the pressure that is to be measured, with this being done in such a manner as to reach the desired proximity of the buckling state. The resonant element always vibrates at the same frequency and the electrical current used for adjusting its temperature is representative of the pressure to be measured.

The invention also provides, a pressure gauge having a resonant element, suitable for performing measurements in oil wells, the gauge comprising a resonant element of crystalline material placed in an evacuated capsule organized to be subjected to a pressure that is to be measured, means for setting said element into resonance, and means for deducing the pressure from a vibration characteristic of the element, the gauge being characterized by the fact that stress control means are provided to ensure that during measurement the resonant element is to be found in a stress state close to buckling, thereby amplifying the sensitivity of the sensor.

More particularly, the resonant element can be made out of silicon.

In a first embodiment, said vibration characteristic of the resonant element is its frequency of vibration.

In another embodiment, said vibration characteristic of the resonant element is an electrical magnitude to which said means need to be subjected in order to ensure that the element keeps a frequency of vibration that is constant in spite of pressure variations.

It will also be observed that in prior art quartz sensors, vibration is excited by piezoelectric means. Other means need to be envisaged for a sensor having a resonant element made of silicon, since silicon is not piezoelectric.

In the invention, the excitation means can be capacitive means or optical means.

In a particular embodiment, said means for operating during measurement to cause the resonant element to be found in a stress state close to its limit condition for buckling can be means for heating the element, in particular by the Joule effect.

Figure 2:
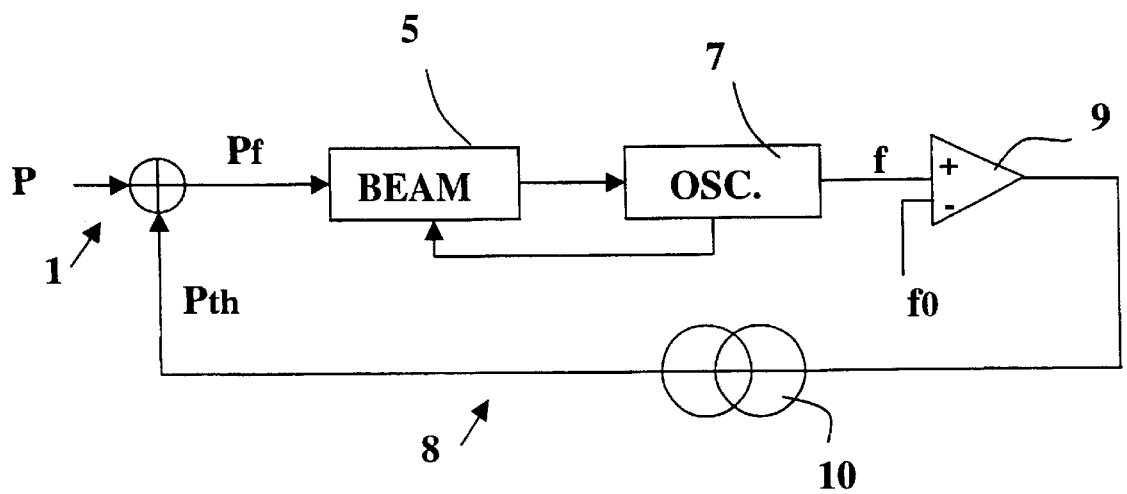

A particular embodiment of the invention is described below by way of non-limiting example with reference to the accompanying diagrammatic drawing, in which:

FIG. 1 shows a pressure gauge of the invention with its measurement cell in an exploded perspective view; and FIG. 2 is a diagram illustrating the general operation of the device.

The measurement cell 1 of the FIG. 1 pressure gauge is made in three parts, namely: a hollow package 2 and two covers 3a and 3b.

The package 2 forms a rigid frame 4. A resonant element, in this case a vibrating beam 5, forms, a bridge between two opposite sides of the frame 4. The cross-section of the beam 5 is small compared with that of the sides of the frame 4 such that the beam can be considered as being in compression between two fixed ends.

Each cover 3a and 3b is constituted simply by means of a plane plate bonded to the package by any appropriate means so as to enclose the beam 5 in an evacuated enclosure.

The package 2 including the vibrating beam 5, and the covers 3a and 3b are all made of silicon. The technique used can be the technique of anisotropic chemical machining, e.g. using potassium hydroxide, as is known in microelectronics.

The faces of the covers 3a and 3b that come into contact with the package 2 are oxidized, e.g. thermally, so that the resulting layer of silica 6 provides electrical insulation.

The covers 3a and 3b can be mounted on the package 2 by direct bonding or by anode soldering a thin layer of powdered glass.

The electronics essentially comprises an oscillator circuit 7 and a servo-control circuit 8 operating on the limiting condition for beam buckling.

The oscillator circuit 7 operates in conventional manner to provide capacitive excitation of the beam 5 and to measure its resonance frequency f. The circuit 7 is shown here as being connected to the cover 3a and to the frame 4 of the package 2.

In FIG. 2, it can be seen how interactions take place between the servo-control circuit 8, the beam 5, and the oscillator circuit 7. The pressure P of the external medium is added in the measurement cell 1 to the pressure $P_{th}$ due to the resistive heating of the beam 5 so as to give the pressure $P_f$ that compresses the beam 5 longitudinally.

The beam 5 is excited into vibration capacitively by the oscillator circuit 7 and it thus vibrates at its resonance frequency f. This frequency is compared in a comparator 9 with a reference $f_0$ that is suitably selected to correspond to the beam being in a state where it is in a limiting condition for buckling.

The frequency difference is used to control a current generator 10. The current delivered by the generator 10 is injected into the beam 5 to generate the pressure $P_{th}$ which ensures the limiting condition in buckling.

The frequency difference supplied by the comparator 9 (or the current supplied by the generator 10) is also representative of the pressure P. This difference (or current) is therefore transmitted to a circuit (not shown) which gives the pressure directly.

Maximum sensitivity is thus made available since the resonance frequency of the beam 5 varies very quickly as a function of the applied compression, and thus as a function of the applied pressure P, when the beam is close to buckling.

By way of example, the vibration modes of a silicon beam that is 0.25 mm long, 0.05 mm wide, and 4.8 μm thick have been computed. Under the conditions used for the computation, the buckling pressure was 1180 bars.

In the absence of any applied pressure, the natural frequency of the first mode of vibration was 657 kHz. Its sensitivity to pressure in the range 0 to 800 bars in said first mode was about 360 Hz/bar. This sensitivity increased significantly for higher pressures and exceeded 2000 Hz/bar in the range 1100 to 1180 bars.

The above description relates only to the embodiment in which frequency excitation/detection is of the capacitive type. In a variant it is possible to provide for excitation/detection to be of the optical type. Under such circumstances, vibration is generated by heating the beam 5 using light pulses delivered by an optical fiber.

The optical embodiment makes it possible to take advantage of the fact that optical fiber is electrically insulating, of small diameter, flexible, and insensitive to electromagnet disturbances.

What is claimed is:

1. A method of measuring pressure of a fluid in an oil well with a pressure gauge including an evacuated capsule having a resonant element contained therein, the method comprising:

(i) placing the evacuated capsule containing the resonant element in the fluid whose pressure is to be measured;

(ii) measuring a vibration frequency f of the resonant element while it is in a stress state that is close to buckling;

(iii) comparing this vibration frequency f with a vibration frequency reference $f_0$ that is suitably selected to correspond to the resonant element being in a state where it is a limiting condition for buckling; and (iv) deducing the pressure of the fluid in the oil well from the comparison between vibration frequency f and the reference vibration frequency $f_0$.

2. A method as claimed in claim 1, wherein the resonant element is made of silicon.

3. A method as claimed in claim 1, further comprising applying an electric signal to the resonant element in order to maintain a constant frequency of vibration irrespective of variation in pressure of the fluid, said constant frequency of vibration ensuring the limiting condition in buckling for the resonant element.

4. A method as claimed in claim 3, wherein the magnitude of the electric signal that must be applied to the resonant element is representative of the pressure of the fluid in the oil well.

5. A method as claimed in claim 1, further comprising adjusting the stress state of the resonant element onto its limiting condition for buckling in the range of pressures to be measured.

6. A method as claimed in claim 5, comprising adjusting the temperature of the resonant element in order to maintain a stress state close to buckling.

7. A method as claimed in claim 5, wherein the step of adjusting the stress state of the resonant element comprises adjusting the temperature of the resonant element using the Joule effect.

8. A method of measuring pressure of a fluid in an oil well with a pressure gauge including an evacuated capsule having a resonant element contained therein, the method comprising:

(i) placing the evacuated capsule containing the resonant element in the fluid whose pressure is to be measured;

(ii) compressing the resonant element with a pressure $P_f$, said pressure being the result of the addition of the pressure P due to the fluid in the oil well and the pressure $P_{th}$ due to the resistive heating of said resonant element;

(iii) measuring the resonance frequency f of the resonant element, said resonance frequency corresponding to the pressure $P_f$;

(iv) comparing the resonance frequency f with a reference resonance frequency $f_0$ that is suitably selected to correspond to the resonant element being in a state where it is a limiting condition for buckling;

(v) using the frequency difference to control the magnitude of the current that must be applied to the resonant element in order to generate the pressure $P_{th}$ that ensures the limiting condition in buckling; and (vi) deducing the pressure P of the fluid in the oil well from the comparison between vibration frequency f and the reference vibration frequency $f_0$.

9. A fluid pressure gauge for performing measurements in oil wells, comprising:

(i) an evacuated capsule which is immersed in a fluid to be measured;

(ii) a resonant element of crystalline material located in the evacuated capsule and subjected to a pressure that is to be measured;

(iii) a resonator for setting the element into resonance;

(iv) stress control means that maintain the resonant element in a stress state close to buckling during measurement; and (v) a comparator that compares the resonance frequency of the resonant element with a reference resonance frequency that is suitably selected to correspond to said resonator element being in a state where it is a limiting condition for buckling.

10. A pressure gauge as claimed in claim 9, further comprising means for deducing fluid pressure from a vibration characteristic of the element.

11. A pressure gauge as claimed in claim 9, wherein the resonant element is made of silicon.

12. A pressure gauge as claimed in claim 9, wherein said stress control means comprise a generator that applies an electrical signal, to the resonant element to maintain a constant frequency of vibration irrespective of variations in fluid pressure, said constant frequency of vibration ensuring the limiting condition in buckling for the resonant element.

13. A pressure gauge as claimed in claim 9, wherein the resonator comprises capacitive means.

14. A pressure gauge as claimed in claim 9, wherein the resonator comprises optical means.

15. A pressure gauge as claimed in claim 9, wherein the stress control means comprises means for heating the resonant element.

* * * * *